(12) United States Patent
Nakanishi et al.

(10) Patent No.: US 11,480,261 B2
(45) Date of Patent: Oct. 25, 2022

(54) ELECTROMAGNETIC VALVE

(71) Applicant: NIDEC TOSOK CORPORATION, Kanagawa (JP)

(72) Inventors: Tomohiko Nakanishi, Kanagawa (JP); Takashi Takai, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 17/486,914

(22) Filed: Sep. 28, 2021

(65) Prior Publication Data

US 2022/0099211 A1  Mar. 31, 2022

(30) Foreign Application Priority Data

Sep. 30, 2020 (JP) .............................. JP2020-165774

(51) Int. Cl.
*F16K 31/06* (2006.01)
*F16K 27/02* (2006.01)

(52) U.S. Cl.
CPC ........ *F16K 31/0655* (2013.01); *F16K 27/029* (2013.01)

(58) Field of Classification Search
CPC .......................... F16K 31/0655; F16K 27/029
See application file for complete search history.

(56) References Cited

U.S. PATENT DOCUMENTS 5,358,005 A * 10/1994 van Prooijen ...... F16K 31/0655
137/546
10,816,104 B2  10/2020  Chen et al.

* cited by examiner

*Primary Examiner* — Eric Keasel
(74) *Attorney, Agent, or Firm* — Hauptman Ham, LLP

(57) ABSTRACT

Provided is an electromagnetic valve capable of preventing damage due to wear while preventing an increase in weight of a valve element. The electromagnetic valve includes a solenoid having a plunger movably supported along an axial direction, a flow path member having a fluid passage flow path and a valve element housing portion, and a valve element disposed in the valve element housing portion and movable along the axial direction together with the plunger. The valve element includes a body part, a valve part that opens and closes the fluid passage flow path as the plunger moves, and a pin in a rod-like shape that passes through the body part along the axial direction. The body part is provided with at least one opening that opens in a direction orthogonal to the axial direction and through which the pin is exposed.

15 Claims, 8 Drawing Sheets

ELECTROMAGNETIC VALVE

CROSS-REFERENCE TO RELATED APPLICATIONS

The present invention claims priority under 35 U.S.C. § 119 to Japanese Patent Application No. 2020-165774 filed on Sep. 30, 2020, the entire content of which is incorporated herein by reference.

FIELD OF THE INVENTION

The present invention relates to an electromagnetic valve.

BACKGROUND

Electromagnetic valves are known in which a flow of fluid such as gas, or water or oil, is switched, or passage and interruption of the fluid are switched. Conventional electromagnetic valves are mounted on, for example, a vehicle including an internal combustion engine such as an engine, and can switch between passage and interruption of a blow-by gas.

These electromagnetic valves each include a nozzle unit having a valve element that opens and closes a flow path through which a fluid passes, and a solenoid unit having a plunger that moves the valve element by excitation.

Unfortunately, the conventional electromagnetic valves each include a plunger that is in direct contact with the valve element, so that the valve element may be worn and damaged when the valve element is made of a resin material and the plunger is made of a metal material, for example. When the valve element is formed of a member having high hardness, for example, the valve element is likely to increase in weight, and accordingly the valve element may move slowly, or smooth operation of the valve element may be hindered.

SUMMARY

An electromagnetic valve according to an aspect of the present invention includes: a solenoid having a bobbin in a tubular shape provided with a through-hole passing through the bobbin along an axial direction, a plunger inserted in the through-hole and movably supported along the axial direction, and a coil wound around an outer peripheral portion of the bobbin and generating a magnetic force with energization to move the plunger in the axial direction; a flow path member provided with a fluid passage flow path having a first flow path, a second flow path, and a relay flow path disposed between the first flow path and the second flow path to allow the first flow path to communicate with the second flow path, and a valve element housing portion having a tubular space communicating with the relay flow path, the flow path member being coupled to the solenoid; and a valve element disposed in the valve element housing portion and movable along the axial direction together with the plunger, the valve element having a body part, a valve part disposed on one axial side of the body part to open and close the relay flow path with movement together with the plunger, and a pin in a rod-like shape that passes through the body part along the axial direction, and that has one axial side, being coupled to the valve part, and the other axial side, being in contact with the plunger, and the body part being provided with at least one opening that opens in a direction orthogonal to the axial direction and through which the pin is exposed.

The above and other elements, features, steps, characteristics and advantages of the present disclosure will become more apparent from the following detailed description of the preferred embodiments with reference to the attached drawings.

DETAILED DESCRIPTION

With reference to FIGS. 1 to 8, an embodiment of an electromagnetic valve of the present invention will be described. In the following description, for convenience of explanation, three axes orthogonal to each other are set as an X-axis, a Y-axis, and a Z-axis. As an example, an XY-plane including the X-axis and the Y-axis is horizontal, and the Z-axis is vertical. A direction parallel to the X-axis may be referred to as an "axial direction (axis O1 direction)", a radial direction centered on this axis may be simply referred to as a "radial direction", and a circumferential direction centered on the axis may be simply referred to as a "circumferential direction". Additionally, a positive side in an X-axis direction may be referred to as "one axial side" or simply as "one side", and a negative side in the X-axis direction may be referred to as "the other axial side" or simply as "the other side". In the present specification, a vertical direction, a horizontal direction, an upper side, and a lower side are simply names for describing a relative positional relationship of each part, and thus an actual placement relationship or the like may be a placement relationship or the like other than the placement relationship or the like indicated by these names.

Figure 1:
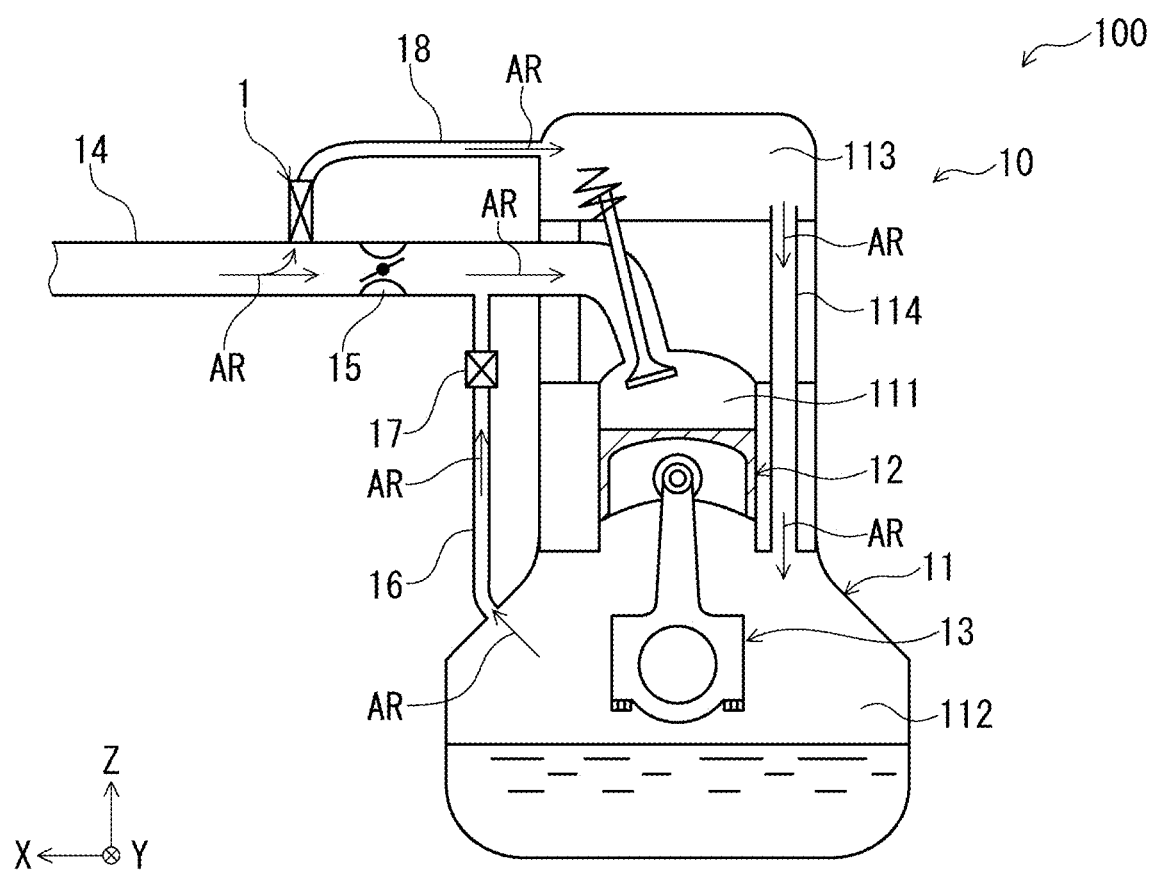
FIG. 1 is a diagram illustrating an example of a use state of an electromagnetic valve (open state) of the present invention.
Figure 2:
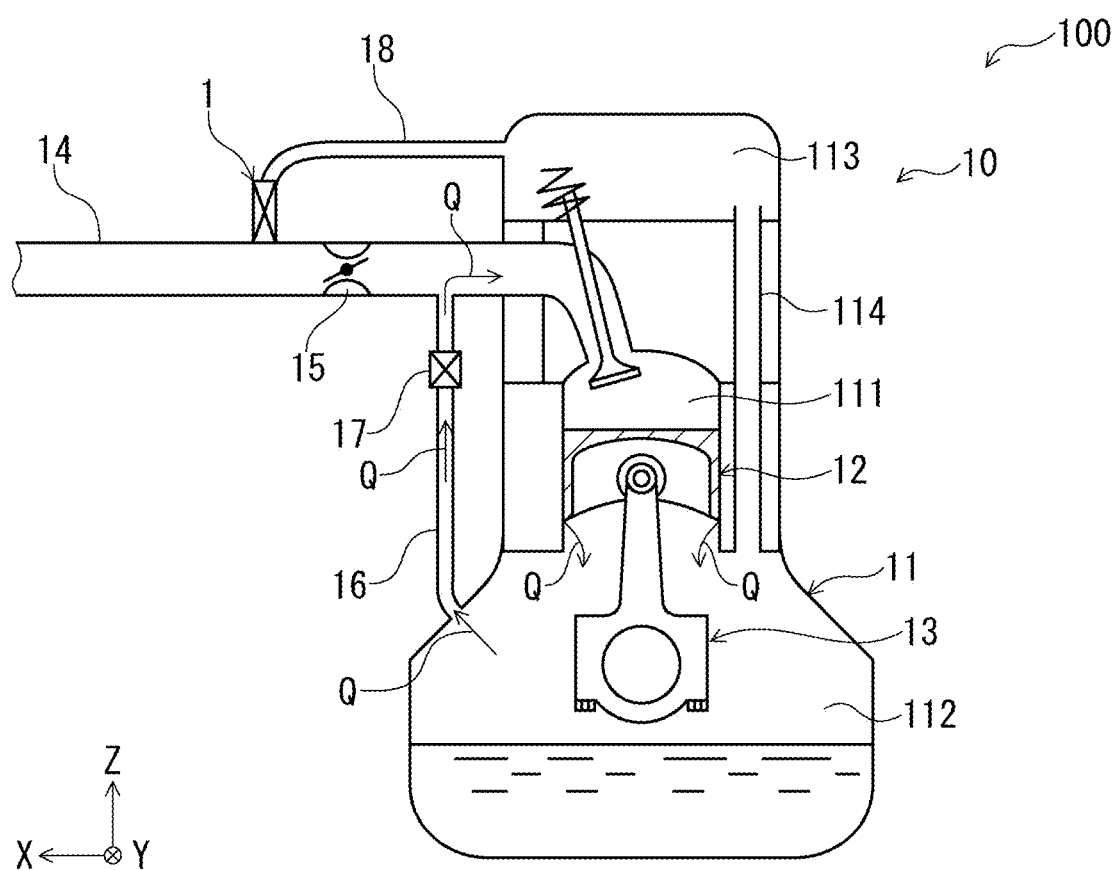
FIG. 2 is a diagram illustrating an example of a use state of the electromagnetic valve (closed state) of the present invention.

As illustrated in FIGS. 1 and 2, an electromagnetic valve 1 is used by being mounted on a vehicle 100 including an internal combustion engine 10 such as an engine, for example. The internal combustion engine 10 includes a housing 11 having a combustion chamber 111, a crank chamber 112, and a buffer chamber 113, a piston 12 movably provided in the combustion chamber 111, and a crank 13 provided in the crank chamber 112 to convert reciprocating motion of the piston 12 into rotational motion.

In the housing 11, the crank chamber 112 and the buffer chamber 113 are connected using an internal flow path 114.

To the combustion chamber 111, an external flow path 14 is connected from outside the housing 11. The external flow path 14 is provided midway with an electromagnetic valve 15 that is a throttle valve.

The external flow path 14 has a downstream side from the electromagnetic valve 15, being connected to the crank chamber 112 using a first auxiliary flow path 16. The first auxiliary flow path 16 is provided midway with an electromagnetic valve 17 that is a PCV valve.

The external flow path 14 has an upstream side from the electromagnetic valve 15, being connected to the buffer chamber 113 using a second auxiliary flow path 18. The second auxiliary flow path 18 is provided with the electromagnetic valve 1 of the present invention at a boundary portion between the external flow path 14 and the second auxiliary flow passage 18. The electromagnetic valve 1 switches opening and closing of the external flow path 14. The electromagnetic valve 1 causes the external flow path 14 (see FIG. 1) to be an open state during normal traveling of the vehicle 100, and causes the external flow path 14 (see FIG. 2) to be a closed state during leak detection for detecting a leak of a gaseous mixture AR or the like (hereinafter, simply referred to as a "leak").

As illustrated in FIG. 1, the open state allows the gaseous mixture AR to pass through the external flow path 14 to flow into the combustion chamber 111, and then the gaseous mixture AR is subjected to combustion. This enables the piston 12 to move. A part of the gaseous mixture AR passing through the external flow path 14 flows into the second auxiliary flow path 18 from the middle of the external flow path 14, and sequentially passes through the buffer chamber 113 and the internal flow path 114 to reach the crank chamber 112. The gaseous mixture AR having flowed into the crank chamber 112 can return to the external flow path 14 through the first auxiliary flow path 16.

As illustrated in FIG. 2, the closed state allows supply of the gaseous mixture AR to the internal combustion engine 10 to be stopped. When the combustion chamber 111 has high pressure due to combustion, a part of a blow-by gas Q in the combustion chamber 111 passes through the piston 12 to flow into the crank chamber 112. After that, the blow-by gas Q in the crank chamber 112 flows into the external flow path 14 through the first auxiliary flow path 16. At this time, when no leakage occurs, pressure in the crank chamber 112 decreases with time. When the pressure in the crank chamber 112 falls below a threshold value, it is determined that no leak has occurred. In contrast, when leakage occurs, the pressure in the crank chamber 112 does not decrease to be prevented from falling below the threshold value, or the pressure is likely to decrease gently to take time to fall below the threshold value. In this case, it is determined that leakage has occurred.

Figure 3:
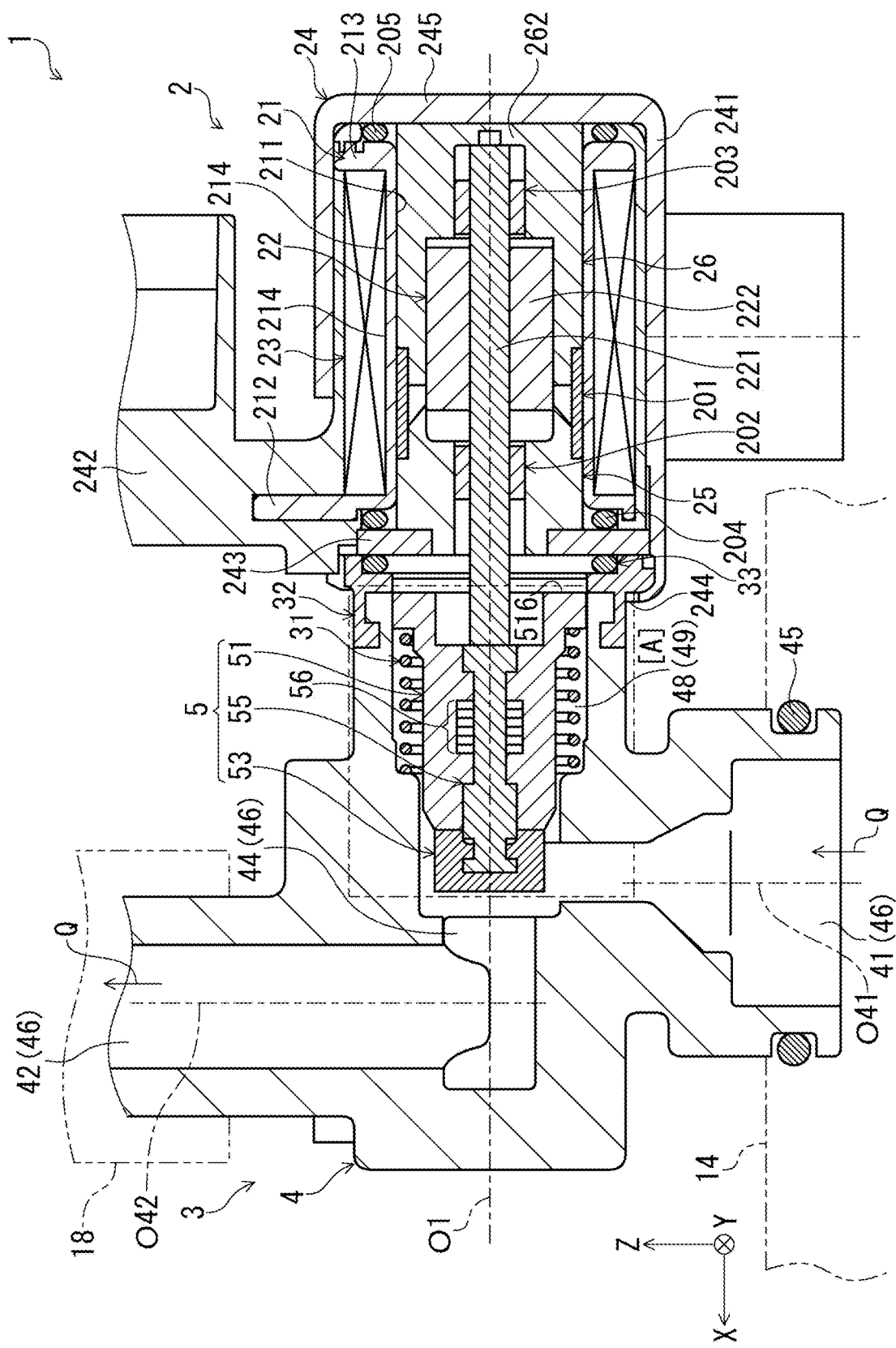
FIG. 3 is a sectional view illustrating an embodiment of the electromagnetic valve of the present invention.

As illustrated in FIG. 3, the electromagnetic valve 1 includes a solenoid 2 disposed on the negative side in the X-axis direction and a valve mechanism 3 disposed on the positive side in the X-axis direction. Hereinafter, a configuration of each unit will be described.

The solenoid 2 includes a bobbin 21, a plunger 22, a coil 23, a case 24, a core 25, and a yoke 26.

The bobbin 21 is a tubular member provided with a through-hole 211. The through-hole 211 passes through the bobbin 21 along the axis O1 direction parallel to the X-axis direction. The through-hole 211 has an inner diameter that is constant along the axis O1 direction. The bobbin 21 is provided on one side with a flange 212 protruding in the radial direction and on the other side with a flange 213 protruding in the radial direction. The bobbin 21 is made of, for example, various kinds of resin material, such as a polyester resin and a polyimide resin.

The bobbin 21 has an outer peripheral portion 214 around which the coil 23 having conductivity is wound. When the coil 23 is brought into an energized state, or when the coil 23 is energized, a magnetic circuit is formed by the bobbin 21, the core 25, and the yoke 26, to generate a magnetic force. This enables the plunger 22 to be moved along the axis O1 direction.

The bobbin 21 has the through-hole 211 into which the core 25 and the yoke 26 are inserted, and the plunger 22 is inserted further inside.

The core 25 is disposed on one side in the axis O1 direction, and the yoke 26 is disposed on the other side in the axis O1 direction.

The core 25 has a cylindrical shape as a whole and is disposed parallel to the X-axis direction. The yoke 26 also has a cylindrical shape as a whole and is disposed parallel to the X-axis direction. The core 25 and the yoke 26 are each made of a soft magnetic material such as iron, or made of a soft magnetic metal material. This enables generating a magnetic circuit in a level allowing the plunger 22 to be sufficiently moved.

The solenoid 2 includes a coupling member 201 that couples the core 25 and the yoke 26 in a separated state in the through-hole 211. The coupling member 201 has a cylindrical shape, and is fitted inside with the other end portion of the core 25 and one end portion of the yoke 26. The coupling member 201 is made of a non-magnetic metal material having resistance to rust, such as austenitic stainless steel.

The plunger 22 is disposed over the core 25 and the yoke 26, and is supported to be alternately movable to one side and the other side along the axis O1 direction, or to be able to reciprocate.

The plunger 22 includes a plunger body 222 in a cylindrical shape and a plunger pin 221 inserted in the plunger body 222. The plunger pin 221 protrudes to both the one side and the other side in the axis O1 direction. The yoke 26 has the other side closed by a wall portion 262, and the plunger pin 221 comes into contact with the wall portion 262, or collides with the wall portion 262, and thus a movement limit of the plunger 22 to the other side is restricted.

The plunger 22 is configured such that the plunger pin 221 is supported by a bush 202 in the core 25, and the plunger pin 221 is supported by a bush 203 in the yoke 26. This enables the plunger 22 to smoothly reciprocate.

The case 24 houses the bobbin 21, the plunger 22, the coil 23, the core 25, and the yoke 26. The case 24 includes a case body 241, a connector member 242, and a ring member 243.

The case body 241 has a bottomed tubular shape. That is, the case body 241 is a tubular member having an opening portion 244 opened on its one side in the axis O1 direction and a wall portion 245 closing its other side. The yoke 26 is in contact with the wall portion 245 from the one side.

The ring member 243 has an annular shape, and is disposed radially outward of the core 25 to be concentric with the core 25. The ring member 243 is in contact with the core 25 from the one side.

As with the core 25, the case body 241 and the ring member 243 are each made of a soft magnetic metal material such as iron.

The connector member 242 is connected to a connector (not illustrated) used for energizing the coil 23. As with the bobbin 21, the connector member 242 is made of, for example, a resin material.

The solenoid 2 includes the case 24 that is provided inside with a gasket 204 disposed between the ring member 243 and the flange 212 of the bobbin 21, and a gasket 205 disposed between the wall portion 245 of the case body 241 and the flange 213 of the bobbin 21.

The gasket 204 has a ring shape, and is disposed on an outer peripheral side of the core 25 to be concentric with the core 25. The gasket 204 is compressed between the ring member 243 and the flange 212 of the bobbin 21, thereby being able to seal between the ring member 243 and the flange 212.

The gasket 205 has a ring shape, and is disposed radially outward of the yoke 26 to be concentric with the yoke 26. The gasket 205 is compressed between the wall portion 245 of the case body 241 and the flange 213 of the bobbin 21, thereby being able to seal between the wall portion 245 and the flange 213.

The gasket 204 and the gasket 205 are each made of an elastic material. The elastic material is not particularly limited, and examples thereof include various rubber materials such as urethane rubber and silicone rubber.

The valve mechanism 3 includes a flow path member 4, a valve element 5, a spring 31, a coupling member 32, and a gasket 33.

The flow path member 4 is coupled to the solenoid 2, and includes a fluid passage flow path 46 through which the blow-by gas Q, which is a fluid, can pass, and a valve element housing portion 49 communicating with the fluid passage flow path 46. As with the bobbin 21, the flow path member 4 is made of, for example, a resin material.

The fluid passage flow path 46 includes a first flow path 41, a second flow path 42, and a relay flow path 44 allowing the first flow path 41 to communicate with the second flow path 42.

The first flow path 41 is provided along the Z-axis direction and opens toward the negative side in the Z-axis direction. The first flow path 41 is connected to the external flow path 14 to communicate with the combustion chamber 111 through the external flow path 14. The flow path member 4 is provided with a gasket 45 fitted from outside to seal a gap between the flow path member 4 and a pipe constituting the external flow path 14.

The second flow path 42 is also provided along the Z-axis direction and opens toward the positive side in the Z-axis direction. The second flow path 42 has a central axis O42 located on the positive side in the X-axis direction with respect to a central axis O41 of the first flow path 41. The second flow path 42 is connected to, for example, the second auxiliary flow path 18.

Between the first flow path 41 and the second flow path 42, the relay flow path 44 is provided along the X-axis direction, or the axis O1 direction. The relay flow path 44 allows the first flow path 41 to communicate with the second flow path 42. For example, when the internal combustion engine 10 equipped with the electromagnetic valve 1 is a natural intake type engine, the blow-by gas Q flows from the first flow path 41 toward the second flow path 42 through the relay flow path 44 as illustrated in FIG. 3.

The valve element housing portion 49 is disposed adjacent to the fluid passage flow path 46 on the negative side in the X-axis direction. The valve element housing portion 49 has a tubular space 48 provided along the X-axis direction. The valve element 5 is housed in the tubular space 48 to be movable along the X-axis direction (axis O1 direction). The tubular space 48 communicates with the relay flow path 44 on the positive side in the X-axis direction and communicates with the first flow path 41 on the negative side in the Z-axis direction (radially outside). When flowing from the first flow path 41 toward the second flow path 42, the blow-by gas Q passes through the tubular space 48 and the relay flow path 44 in this order.

Figure 4:
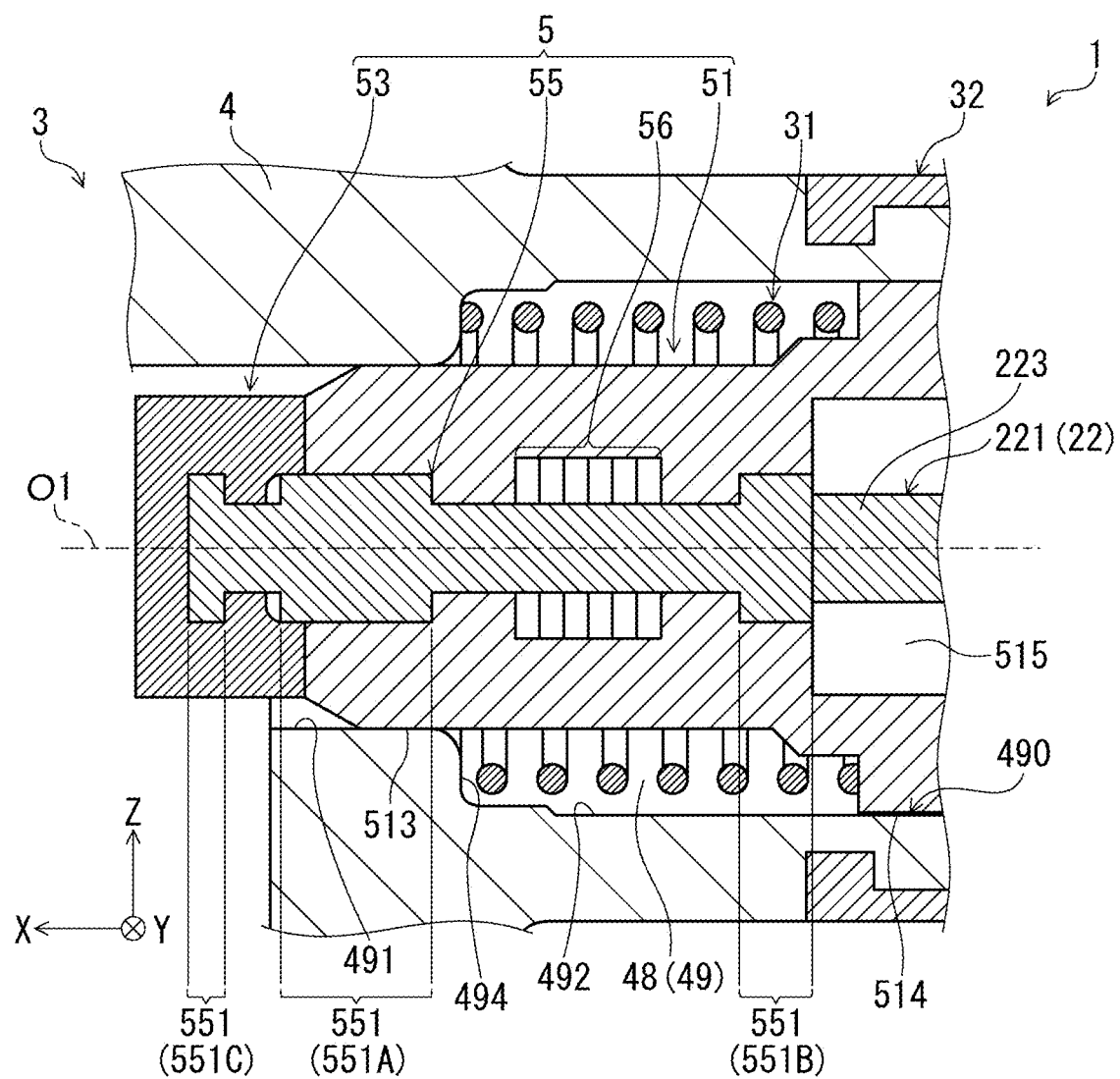
FIG. 4 is an enlarged view of a region [A] surrounded by a two-dot chain line in FIG. 3.

As illustrated in FIG. 4, the valve element housing portion 49 includes an inner peripheral portion 490 provided with a reduced diameter portion 491 having a reduced inner diameter and an increased diameter portion 492 having an increased inner diameter. The reduced diameter portion 491 is located on the one side in the axis O1 direction in the inner peripheral portion 490, and the increased diameter portion 492 is located on the other side in the axis O1 direction in the inner peripheral portion 490.

As illustrated in FIG. 3, the coupling member 32 is disposed on the negative side in the X-axis direction of the valve element housing portion 49. The coupling member 32 has a ring shape and is fixed on an outer peripheral side (radially outer side) of the valve element housing portion 49. The case body 241 of the solenoid 2 is fixed to the coupling member 32 by crimping, for example. This causes the solenoid 2 and the flow path member 4 to be coupled to each other.

The gasket 33 is disposed between the coupling member 32 and the ring member 243 of the solenoid 2 while being compressed. The gasket 33 has a ring shape and is provided concentrically with the valve element housing portion 49. The gasket 33 can seal between the coupling member 32 and the ring member 243, so that leakage of the blow-by gas Q from between them, or between the flow path member 4 and the solenoid 2, can be prevented. As with the gasket 204, the gasket 33 is made of, for example, an elastic material such as urethane rubber.

As illustrated in FIG. 4, the valve element 5 is housed in the valve element housing portion 49. The valve element 5 can move along the axis O1 direction together with the plunger 22. When the valve element 5 moves, the relay flow path 44 can be opened or closed. That is, the relay flow path 44 can be switched between an open state and a closed state. The open state enables passage of the blow-by gas Q in the fluid passage flow path 46. FIG. 3 illustrates the open state. In contrast, the closed state blocks the passage of the blow-by gas Q in the fluid passage flow path 46.

The valve element 5 includes a body part 51, a valve part 53, and a pin 55.

The body part 51 has a columnar shape, and is disposed in the valve element housing portion 49 (tubular space 48) in an attitude in which a central axis thereof is parallel to the axis O1. As with the bobbin 21, for example, the body part 51 is made of, for example, a resin material.

The body part 51 includes a first guide portion (guide portion) 513 and second guide portion (guide portion) 514.

The first guide portion 513 is provided in an outer peripheral portion of the body part 51 on the positive side in the X-axis direction, and is a constant outer diameter portion having a constant outer diameter along the axis O1. The first guide portion 513 is in contact with the reduced diameter portion 491 (inner peripheral portion 490) of the valve element housing portion 49. As a result, when the valve element 5 moves along the axis O1 direction, the first guide portion 513 slides by being guided by the reduced diameter portion 491, and thus the valve element 5 can stably move.

The second guide portion 514 is a flange portion provided in an outer peripheral portion of the body part 51 on the negative side in the X-axis direction with respect to the first guide portion 513 and having a larger outer diameter than the first guide portion 513. The second guide portion 514 is in contact with the increased diameter portion 492 (inner peripheral portion 490) of the valve element housing portion 49. As a result, when the valve element 5 moves along the axis O1, the second guide portion 514 slides by being guided by the increased diameter portion 492. The valve element 5 can further stably move together with the guide using the reduced diameter portion 491 of the first guide portion 513.

The body part 51 is provided with a recess 515 radially inward of the second guide portion 514. The recess 515 is opened in a surface (base end surface) 516 of the body part 51 on the negative side in the X-axis direction. This allows a portion (leading end portion) 223 of the plunger pin 221 on the positive side in the X-axis direction to enter the recess 515 and press the valve element 5 toward the positive side in the X-axis direction (one side in the axis O1 direction). Then, the valve element 5 is moved by pressing of the plunger 22, and the relay flow path 44 can be brought into a closed state.

The valve part 53 is disposed in the body part 51 on the one side in the axis O1 direction. As the valve element 5 moves together with the plunger 22, the valve element 5 can approach the relay flow path 44 to close the relay flow path 44, or can separate from the relay flow path 44 to open the relay flow path 44. Thus, the valve element 5 functions as a member that opens and closes the relay flow path 44.

The valve part 53 is fixed to the body part 51 using a pin.

As with the gasket 204, the valve part 53 is made of, for example, an elastic material such as urethane rubber.

The valve part 53 has, for example, a columnar or plate-like shape. The valve part 53 has a smaller outer diameter than the first guide portion 513 in contact with the reduced diameter portion 491 of the valve element housing portion 49. This prevents the valve part 53 from coming into contact with the reduced diameter portion 491, so that movement of the valve element 5 can be prevented from being hindered by the valve part 53.

The body part 51 is provided with the pin 55 passing through the body part 51 along the axis O1 direction. The pin 55 has a rod-like shape and is disposed coaxially with the body part 51. The pin 55 is coupled to the valve part 53 on the one side in the axis O1 direction and is in contact with the plunger 22 on the other side in the axis O1 direction. As a result, when the plunger 22 moves toward the one side in the axis O1 direction, pressing force from the plunger 22 can be transmitted to the valve part 53 using the pin 55. This enables the valve part 53 to approach the relay flow path 44 to close the relay flow path 44 to form a closed state.

The pin 55 has multiple increased diameter portions 551 each having an outer diameter increased. Although these increased diameter portions 551 are disposed side by side along the axis O1 direction, and the number of the increased diameter portions is three in the present embodiment, the present invention is not limited thereto. The number of the increased diameter portions may be two, or four or more, for example. The three increased diameter portions 551 in the present embodiment includes the increased diameter portion 551 located at the center that is referred to as a "first increased diameter portion 551A", the increased diameter portion 551 located on the other side in the axis O1 direction of the first increased diameter portion 551A that is referred to as a "second increased diameter portion 551B", and the increased diameter portion 551 located on the one side in the axis O1 direction of the first increased diameter portion 551A that is referred to as a "third increased diameter portion 551C".

The first increased diameter portion 551A to the third increased diameter portion 551C are disposed apart from each other in the axis O1 direction, and a distance between the first increased diameter portion 551A and the second increased diameter portion 551B is longer than a distance between the first increased diameter portion 551A and the third increased diameter portion 551C. Most of an outer peripheral portion of the first increased diameter portion 551A and the entire outer peripheral portion of the second increased diameter portion 551B are covered with the body part 51. This causes the pin 55 to be hooked in the body part 51 by the first increased diameter portion 551A and the second increased diameter portion 551B that are disposed apart from each other as far as possible, so that the pin 55 is prevented from being detached from the body part 51, or is prevented from coming off from the body part 51.

The first increased diameter portion 551A to the third increased diameter portion 551C are different from each other in total length along the axis O1 direction, and the first increased diameter portion 551A has the longest length, the third increased diameter portion 551C has the shortest length, and the second increased diameter portion 551B has an intermediate length. Then, the valve part 53 is attached to the third increased diameter portion 551C. The third increased diameter portion 551C has the shortest overall length, or the thinnest thickness, so that work of fitting the valve part 53 by covering the third increased diameter portion 551C with the valve part 53 can be easily performed.

Although the first increased diameter portion 551A to the third increased diameter portion 551C each have an identical outer diameter in the present embodiment, they each may have a different outer diameter.

The pin 55 is not particularly limited in constituent material, and for example, a metal material such as stainless steel can be used. This enables pressing force from the plunger to be stably received. Even when the pin 55 repeatedly comes into contact with the plunger pin 221, damage of the pin 55 due to its wear can be prevented.

In the valve element housing portion 49, the spring 31 is disposed. The spring 31 is a pressing member that presses the valve element 5 toward the other side in the axis O1 direction. The valve element 5 can move toward the other side in the axis O1 direction by being pressed by the spring 31 while the energized state for the coil 23 is released. This enables the valve part 53 to be separated from the relay flow path 44 to open the relay flow path 44 to form an open state.

As the spring 31, for example, a coil spring is preferably used. This enables the spring 31 to be disposed concentrically with the valve element 5 around an outer periphery of the valve element 5 in the valve element housing portion 49. Then, the spring 31 comes into contact with not only a stepped portion 494 that is a boundary portion between the reduced diameter portion 491 and the increased diameter portion 492 on the one side in the axis O1 direction, but also the second guide portion 514 on the other side in the axis O1 direction to be brought into a compressed state. This enables the valve element 5 to be stably pressed without excess or deficiency.

In the electromagnetic valve 1, the valve element 5 is preferably as light as possible. The reason is that when the valve element 5 has a relatively large weight, the valve element 5 moves slow, or smooth operation of the valve element 5 is hindered, and thus switching between the open state and the closed state of the relay flow path 44 may not be performed quickly. Thus, the electromagnetic valve 1 is configured to reduce the weight of the valve element 5. Hereinafter, the configuration and effect of weight reduction will be described.

Figure 5:
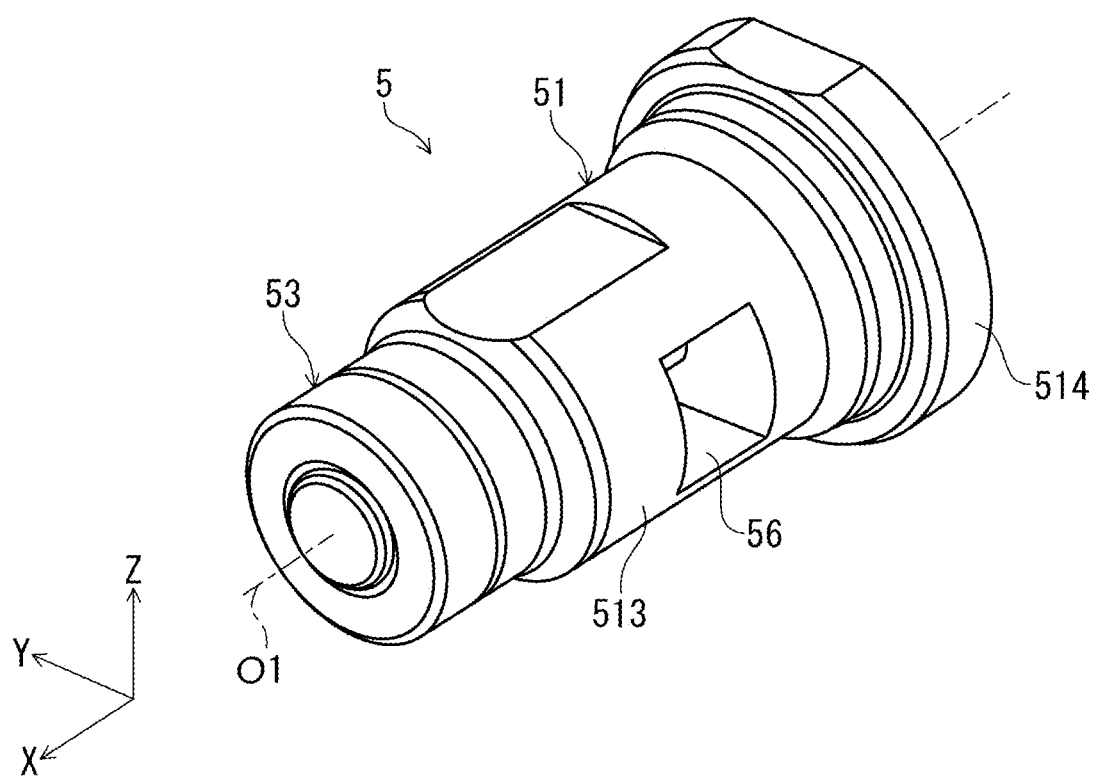
FIG. 5 is a perspective view of a valve element provided in the electromagnetic valve illustrated in FIG. 3.

As illustrated in FIGS. 4 and 5, the body part 51 is provided with at least one opening 56 between the first guide portion 513 and the second guide portion 514. The opening 56 opens in a direction orthogonal to the axis O1 direction, or in the Y-axis direction. The opening 56 has a depth enough to expose the pin 55. The valve element 5 can be reduced in weight due to the opening 56 above provided in the body part 51. This enables the valve element 5 to move smoothly, and thus switching between the open state and the closed state of the relay flow path 44 can be performed quickly.

Although the number of openings 56 is two in the present embodiment, the number is not limited thereto, and may be one, or three or more. The valve element 5 is improved in weight reduction by the number of openings 56.

Although the opening 56 has a rectangular shape in side view, or when viewed from the direction (Y-axis direction) orthogonal to the axis O1 direction in the present embodiment, the shape is not limited thereto, and may be, for example, another quadrangle such as a square, a circle, or the like.

As described above, the body part 51 has the recess 515. As with the opening 56, the recess 515 also contributes to weight reduction of the valve element 5. As a result, the opening 56 and the recess 515 combine to further improve the weight reduction of the valve element 5.

Besides the effect of weight reduction, the opening 56 also has an effect of promoting smooth operation of the spring 31, or expansion and contraction operation thereof.

As described above, the fluid passing through the fluid passage flow path 46 is the blow-by gas Q. The blow-by gas Q may contain adhesive impurities. A part of the blow-by gas Q may also flow into the valve element housing portion 49. In this case, the impurities may enter between the body part 51 and the spring 31 to hinder the expansion and contraction operation of the spring 31. However, the impurities having entered between the body part 51 and the spring 31 flow into the opening portion 56 as the valve element 5 reciprocates. This enables the impurities to be recovered in the opening 56 and retained as it is, and thus smooth expansion and contraction operation of the spring 31 is promoted.

In the present embodiment, the two openings 56 are provided across the pin 55, or provided at an equal interval along the circumferential direction of the body part 51. This enables increasing an opportunity to recover the impurities as compared with when the two openings 56 are unevenly provided (concentrated) in a part of the body part 51, for example.

As illustrated in FIG. 3, each opening 56 is located between the first increased diameter portion 551A and the second increased diameter portion 551B in side view. This sufficiently secures an area with which the body part 51 and the first increased diameter portion 551A are caught by each other, and an area with which the body part 51 and the second increased diameter portion 551B are caught by each other, and thus the pin 55 is further prevented from being detached from the body part 51. When the opening portion 56 and the first increased diameter portion 551A overlap each other in side view, an area with which the body part 51 and the first increased diameter portion 551A are caught by each other is reduced by an area of the opening portion 56. Similarly, when the opening 56 and the second increased diameter portion 551B overlap each other in side view, an area with which the body part 51 and the second increased diameter portion 551B are caught by each other is reduced by an area of the opening 56.

Next, a method for manufacturing the valve element 5 will be described with reference to FIGS. 6 to 8.

The present manufacturing method uses a mold 9. The mold 9 includes an upper mold 91, a lower mold 92, and two support members 93.

The upper mold 91 has a cavity 911. The cavity 911 is mainly used for molding the first guide portion 513 of the body part 51. The upper mold 91 is movable in the vertical direction.

The lower mold 92 is disposed under the upper mold 91. The lower mold 92 has a cavity 921. The cavity 921 is mainly used for molding the second guide portion 514 and the recess 515 of the body part 51.

Figure 6:
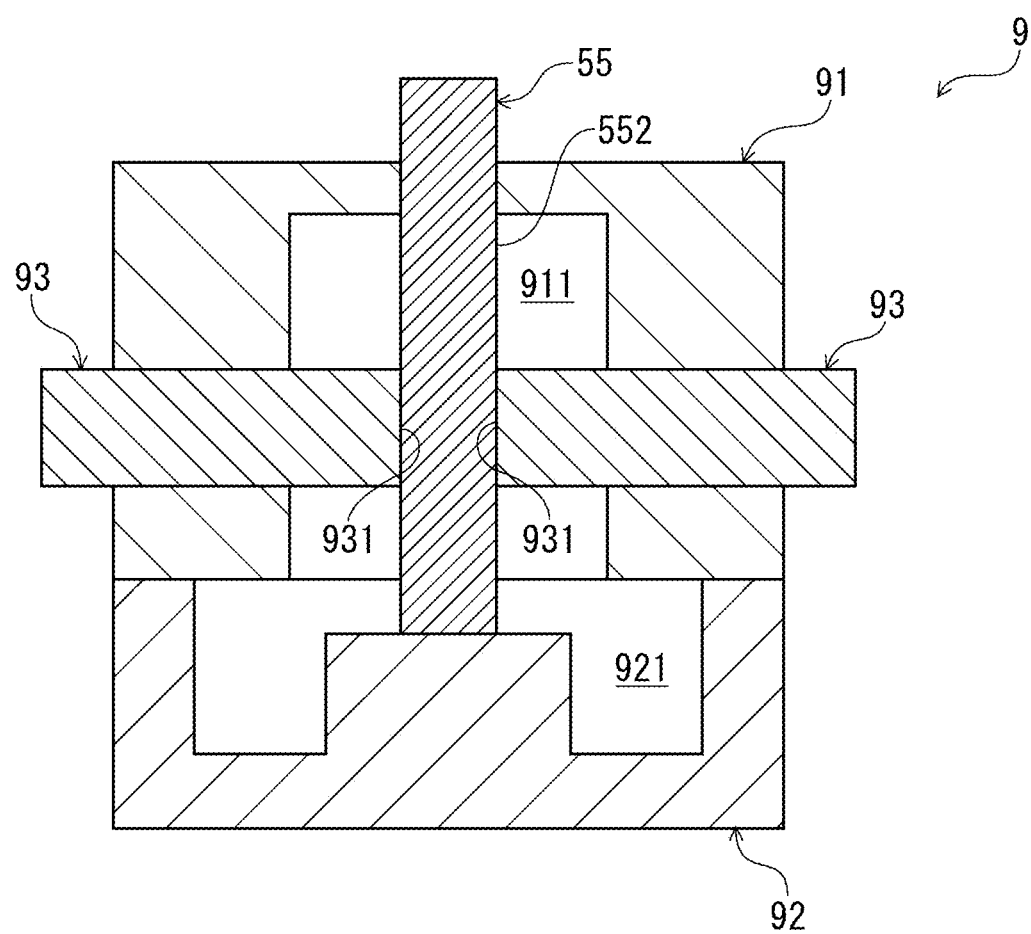
FIG. 6 is a schematic sectional view for sequentially illustrating a manufacturing process of the valve element illustrated in FIG. 5.
Figure 7:
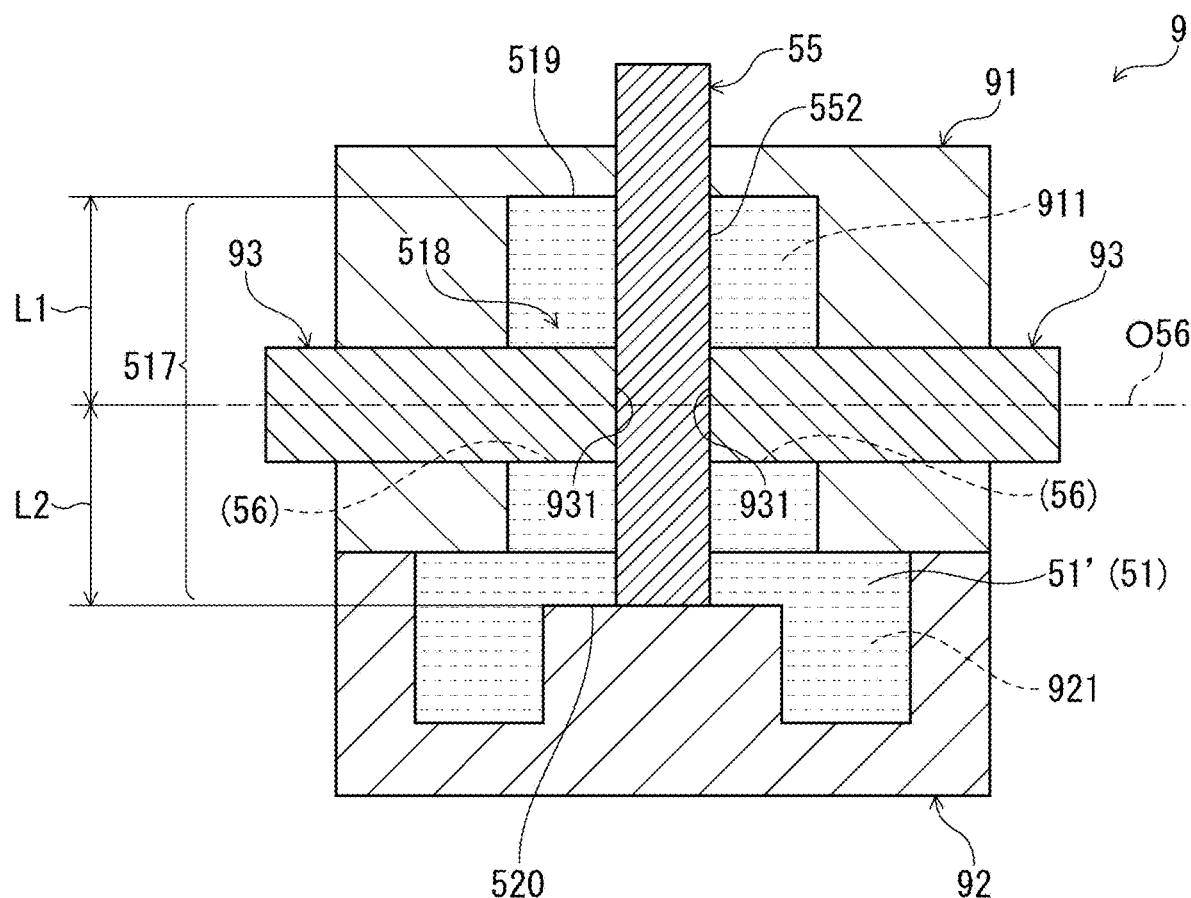
FIG. 7 is a schematic sectional view for sequentially illustrating the manufacturing process of the valve element illustrated in FIG. 5.
Figure 8:
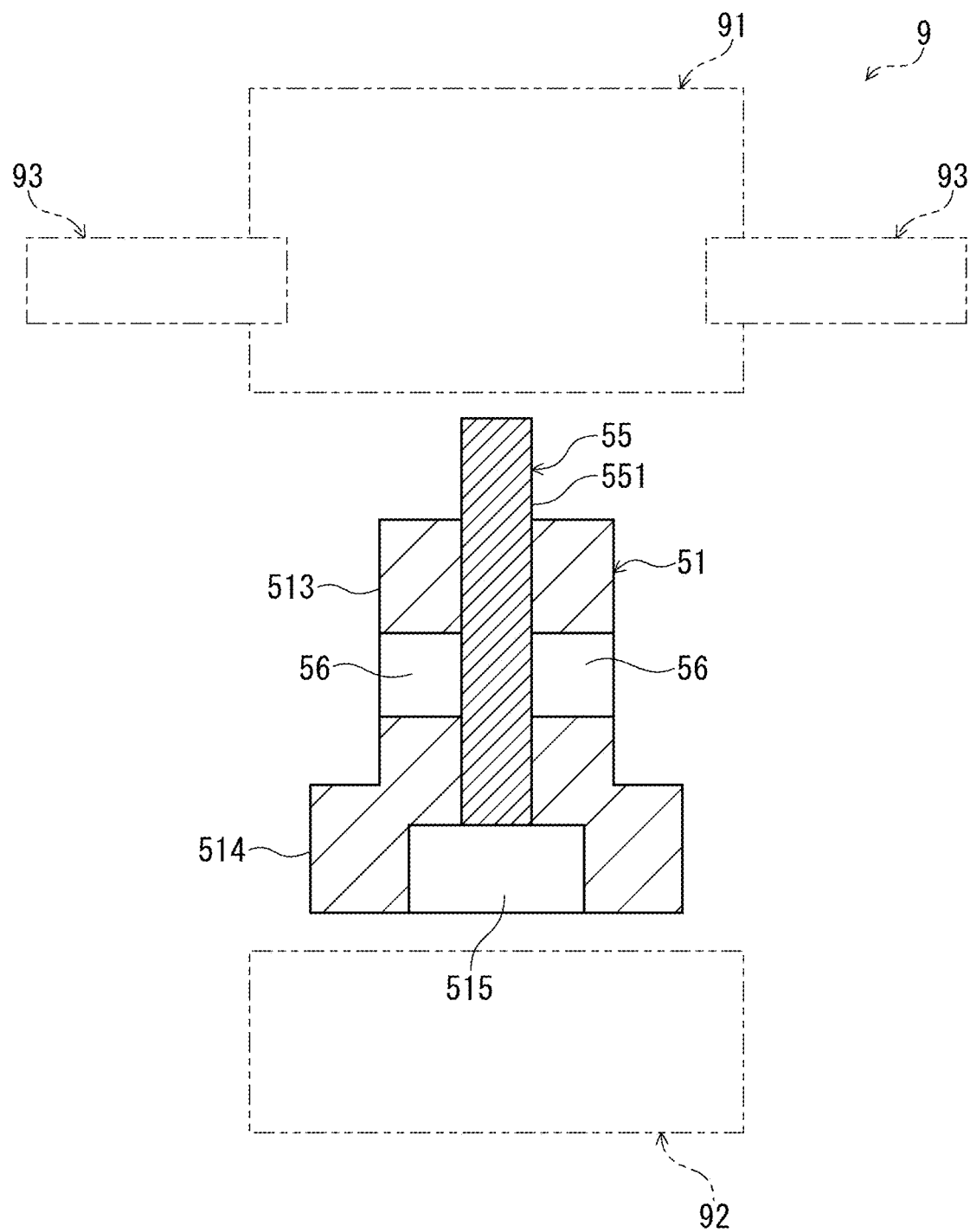
FIG. 8 is a schematic sectional view for sequentially illustrating the manufacturing process of the valve element illustrated in FIG. 5.

The mold 9 allows the two support members 93 to be inserted into and removed from the cavity 911 of the upper mold 91 in the horizontal direction (left-right direction in FIGS. 6 to 8). Each of the support members 93 is used for providing the opening 56 in the body part 51. The support members 93 are each in a columnar shape, and are inserted and removed in directions opposite to each other.

First, as illustrated in FIG. 6, the upper mold 91 and the lower mold 92 are brought into a clamped state. In the clamped state, the pin 55 is inserted from vertically above the upper mold 91 to the cavity 921 through the cavity 911. The support members 93 are each inserted into the cavity 911 from the outside in the horizontal direction. The support members 93 each have an end surface 931 that comes into contact with an outer peripheral portion 552 of the pin 55. This allows the pins 55 to be horizontally sandwiched between the support members 93. The pin 55 in such a clamped state is brought into a state in which the pin 55 is supported at two support points of the upper mold 91 and the support member 93 midway in its longitudinal direction (hereinafter, the state may also be referred to as a "double-supported state").

Next, as illustrated in FIG. 7, the cavity 911 and the cavity 921 are collectively filled with a liquid composition 51' while the double-supported state is maintained. The liquid composition 51' contains the resin material constituting the body part 51.

When the liquid composition 51' is filled, the pin 55 receives a pressing force from the liquid composition 51', and bends, or tilts with respect to the vertical direction. This may cause positional displacement, but the positional displacement is prevented by the double-supported state. This enables a position (attitude) of the pin 55 in the mold 9 to be stably maintained.

Then, the liquid composition 51' is solidified (or cured). Thus, the body part 51 is molded. The position of the pin 55 is maintained by the double-supported state even during solidification (curing) of the liquid composition 51'. This prevents the positional displacement of the pin 55 in the body part 51, so that the pin 55 is concentrically disposed.

As described above, the body part 51 is provided with the two openings 56 across the pin 55. That is, the body part 51 is provided with two openings 56 facing each other. Thus, the two support members 93 for providing the two openings 56 also face each other in the cavity 911. This enables the pin 55 to be firmly sandwiched between the support members 93, and thus the double-supported state can be stably maintained.

The entire body part 51 (the entire length) includes a pin insertion portion 517 into which the pin 55 is inserted and in which each opening 56 is provided in a central portion 518 of the pin insertion portion 517 in the vertical direction in FIG. 7 (the axis O1 direction of the body part 51). This enables the two support points for the pin 55 to be separated from each other as much as possible, so that the double-supported state is stably maintained.

In particular, each opening 56 is preferably provided closer to a lower side (the other end side in the axis O1 direction) in FIG. 7 in the central portion 518. That is, in comparison between a distance L1 between an upper end surface 519 of the pin insertion portion 517 and a center line O56 of the opening 56 and a distance L2 between a lower end surface 520 of the pin insertion portion 517 and the center line O56 of the opening 56, a relationship in which the distance L1 is larger than the distance L2 is preferably satisfied. This enables the two support points for the pin 55 to be further separated from each other as much as possible, so that the double-supported state is more stably maintained. Although the distance L1 and the distance L2 preferably have a magnitude relationship in which the distance L1 is larger than the distance L2, the magnitude relationship is not limited thereto. For example, the distance L1 may be equal to the distance L2, or the distance L1 may be smaller than the distance L2.

Next, as illustrated in FIG. 8, after each support member 93 is retracted, the upper mold 91 and the lower mold 92 are brought into a mold open state. This enables the body part 51 and the pin 53 to be obtained as an integrated product by integral molding, or an insert-molded product. As described above, the method for manufacturing the valve element 5 enables the integrated product of the body part 51 and the pin 53 to be easily manufactured by insert molding.

When the valve part 53 is attached to the pin 55, the valve element 5 is completed.

Although the electromagnetic valve of the present invention is described with reference to the illustrated embodiment, the present invention is not limited thereto, and each part constituting the electromagnetic valve can be replaced with a part having any configuration capable of exhibiting similar functions. Additionally, an arbitrary component may be added.

Although the electromagnetic valve 1 is mounted and used in the vehicle 100 equipped with the internal combustion engine 10 such as an engine in the above embodiment, the application place of the electromagnetic valve is not limited to the vehicle 100. The fluid that is switched between passage and interruption by the electromagnetic valve 1 is not limited to the gas (blow-by gas Q), and may be a liquid or a mixture of gas and liquid.

Although the electromagnetic valve 1 is configured to allow the blow-by gas Q to flow from the first flow path 41 toward the second flow path 42 in the embodiment described above, the blow-by gas Q is also allowed to flow from the second flow path 42 toward the first flow path 41 depending on a use state of the electromagnetic valve 1.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electromagnetic valve comprising:
a solenoid including:
a bobbin in a tubular shape provided with a through-hole passing through the bobbin along an axial direction;
a plunger inserted in the through-hole and movably supported along the axial direction; and
a coil wound around an outer peripheral portion of the bobbin and generating a magnetic force with energization to move the plunger in the axial direction;
a flow path member including:
a fluid passage flow path having:
a first flow path;
a second flow path; and
a relay flow path disposed between the first flow path and the second flow path to allow the first flow path to communicate with the second flow path; and
a valve element housing portion having a tubular space communicating with the relay flow path,
the flow path member being coupled to the solenoid; and
a valve element disposed in the valve element housing portion and movable along the axial direction together with the plunger,
the valve element including:
a body part;
a valve part disposed on one axial side of the body part to open and close the relay flow path with movement together with the plunger; and
a pin in a rod-like shape that passes through the body part along the axial direction, and that has one axial side, being coupled to the valve part, and the other axial side, being in contact with the plunger, and
the body part being provided with at least one opening that opens in a direction orthogonal to the axial direction and through which the pin is exposed.

2. The electromagnetic valve according to claim 1, wherein
the at least one opening comprises a plurality of openings.

3. The electromagnetic valve according to claim 2, wherein
the at least one opening comprises two openings provided across the pin.

4. The electromagnetic valve according to claim 3, wherein
the two openings are provided facing each other.

5. The electromagnetic valve according to claim 1, wherein
the opening is provided in a central portion of the body part in the axial direction.

6. The electromagnetic valve according to claim 5, wherein
the opening is provided closer to another axial end side in the central portion.

7. The electromagnetic valve according to claim 1, wherein
the pin includes multiple increased diameter portions that are each have an outer diameter increased and that are disposed apart from each other in the axial direction.

8. The electromagnetic valve according to claim 7, wherein
the multiple increased diameter portions include a first increased diameter portion provided on one axial side and a second increased diameter portion provided on the other axial side, and
at least a part of an outer peripheral portion of each of the first increased diameter portion and the second increased diameter portion is covered with the body part.

9. The electromagnetic valve according to claim 8, wherein
the opening is located between the first increased diameter portion and the second increased diameter portion when viewed from a direction orthogonal to the axial direction.

10. The electromagnetic valve according to claim 1, wherein
the body part and the pin are formed as an integrated product by integral molding.

11. The electromagnetic valve according to claim 1, wherein
the valve element includes a guide portion guided to an inner peripheral portion of the valve element housing portion.

12. The electromagnetic valve according to claim 11, wherein
the guide portion is provided in the body part.

13. The electromagnetic valve according to claim 11, wherein
the valve element housing portion is provided inside with a pressing member that presses the valve element toward the other axial side.

14. The electromagnetic valve according to claim 13, wherein
the valve element is moved toward the other axial side while being in contact with the inner peripheral portion of the valve element housing portion by being pressed by the pressing member.

15. The electromagnetic valve according to claim 13, wherein
the valve element housing portion has an inner peripheral portion including a reduced diameter portion having an inner diameter reduced on one axial side and an increased diameter portion having an inner diameter increased on the other axial side, and
the pressing member is a spring that is disposed concentrically with the valve element around an outer periphery of the valve element in the valve element housing portion while being in contact with not only a boundary portion between the reduced diameter portion and the increased diameter portion on one axial side, but also the guide portion on the other axial side.

* * * * *